B. R. VAN KIRK.
TRUCK.
APPLICATION FILED JAN. 21, 1914.

1,133,203.

Patented Mar. 23, 1915.
2 SHEETS—SHEET 1.

Witnesses—

Inventor—
Benjamin R. Van Kirk
by his Attorneys

B. R. VAN KIRK.
TRUCK.
APPLICATION FILED JAN. 21, 1914.
1,133,203.
Patented Mar. 23, 1915.
2 SHEETS—SHEET 2.
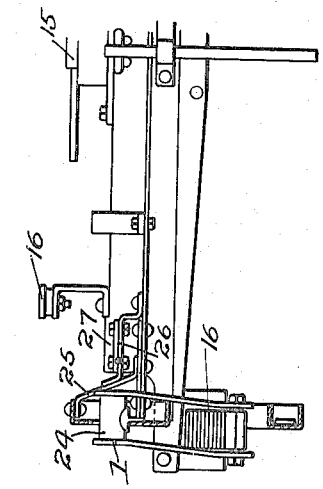
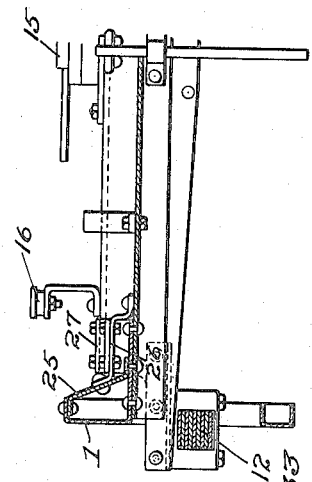
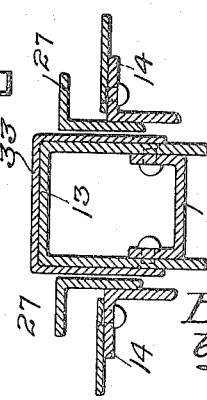
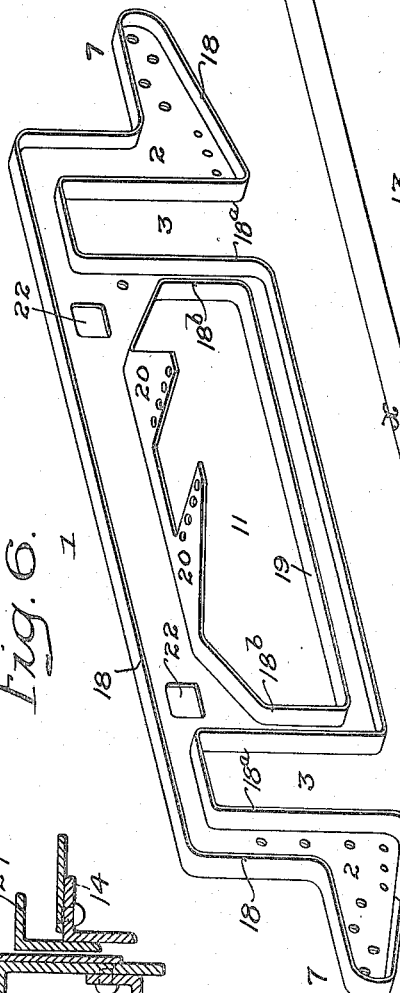
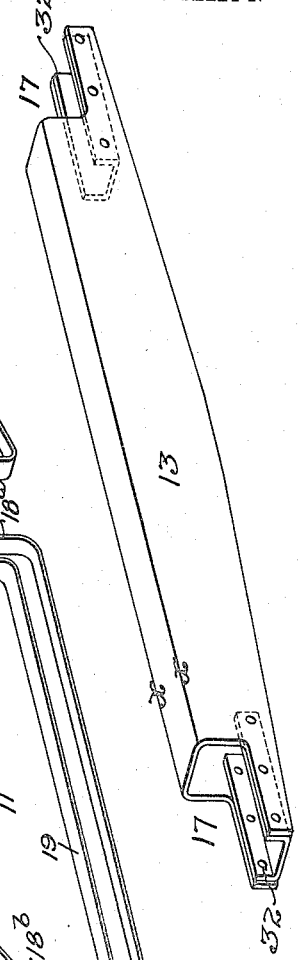
Witnesses—
Inventor—
Benjamin R. Van Kirk
by his Attorneys

UNITED STATES PATENT OFFICE.

BENJAMIN R. VAN KIRK, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

TRUCK.

1,133,203. Specification of Letters Patent. Patented Mar. 23, 1915.

Application filed January 21, 1914. Serial No. 813,428.

*To all whom it may concern:*

Be it known that I, BENJAMIN R. VAN KIRK, a citizen of the United States, residing in Philadelphia, Pennsylvania, have invented certain Improvements in Trucks, of which the following is a specification.

One object of my invention is to construct a truck in a light and substantial manner, making it of pressed sheet metal and wrought shapes.

A further object is to construct the side frames of pressed sheet metal and to make the gussets, or diagonal corner pieces, an integral part of the side frames.

A still further object is to provide means for reinforcing said side frames.

These objects I attain in the following manner, reference being had to the accompanying drawings, in which:—

Figure 1:
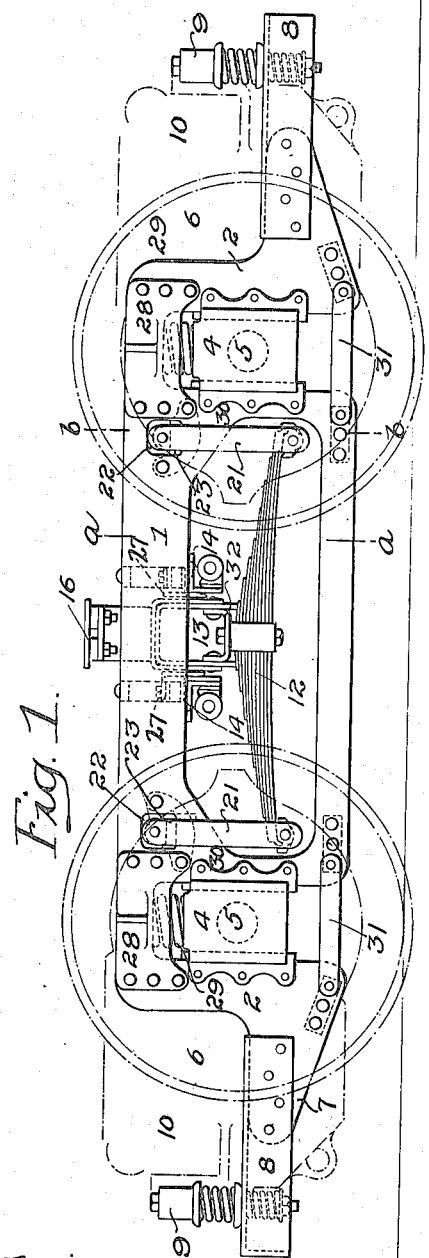
Figure 2:
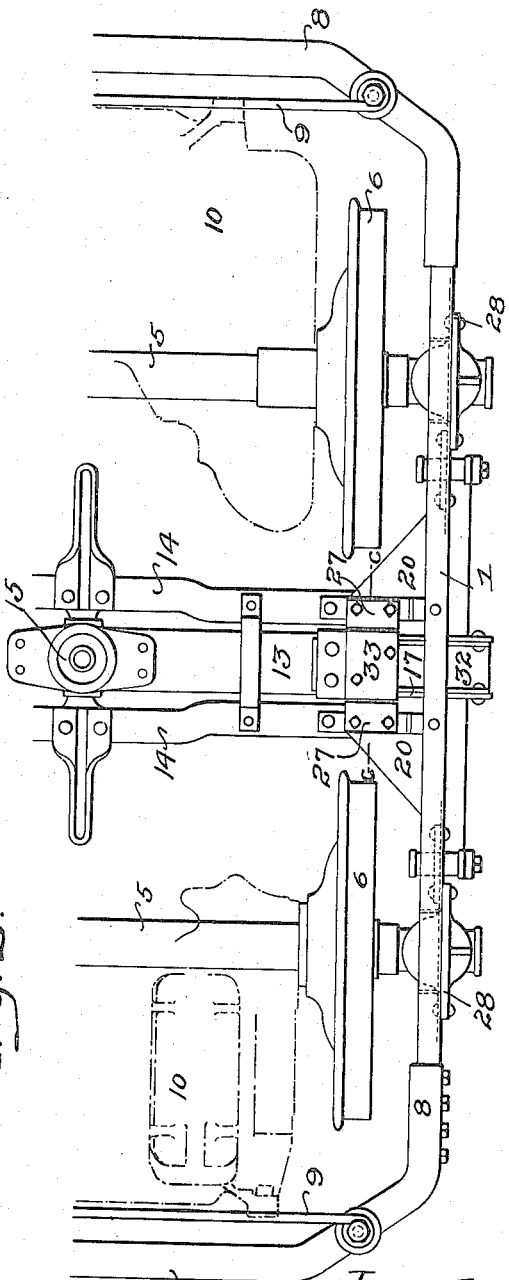

Figure 1, is a side view of a truck embodying my invention; Fig. 2, is a plan view of one-half of the truck; Fig. 3, is a transverse sectional view of one-half of the truck on the line a—a, Fig. 1; Fig. 4, is a transverse sectional view on the line b—b, Fig. 1; Fig. 5, is a sectional view on the line c—c, Fig. 2; Fig. 6, is a perspective view of one of the side frames; and Fig. 7, is a perspective view of the bolster.

In the present instance, the truck is a four wheel truck of the type in which the wheels are of the same diameter, but it will be understood that the invention can be used in connection with a truck in which one pair of wheels is less in diameter than the other pair.

Referring to the drawings, 1, 1 are the side frames of the truck made as clearly shown in the perspective view, Fig. 6, and these side frames have pedestals 2 in which are openings 3 for the boxes 4 in which the axles are mounted. On these axles are the wheels 6.

Projecting from each end of the frame 1 is an extension 7 to which the connecting bar 8 is attached by bolts or rivets. Attached to this connecting frame are the spring supported bars 9 which carry one portion of the motor 10 shown in outline. Each side frame 1 has a central opening 11 in which is mounted the longitudinally arranged spring 12 supporting the bolster 13 which is located between the two transoms 14. This bolster carries a center bearing 15 and the side bearings 16.

The two side frames 1 are made of sheet metal plates pressed, as shown in Fig. 4, and a flange 18 extends around the outer edge of each frame and around the inner edge of each pedestal, as at 18ª, and continues across the tie bar 19. The central opening is formed in the plate, not only for the purpose of lightening the structure, but also for the purpose of accommodating the spring. The plate is flanged at 18ᵇ around this opening, thus materially strengthening the plate.

The side frames are connected together at the center by the transoms 14, made of angle iron, and, in order to firmly connect the plates to the transoms, I form, integral with each plate, gussets or corner pieces 20, to which the transoms are secured by rivets or bolts. These plates are so proportioned that they can be cut from the side frame blank and bent up with the flange 18ᵇ to form the opening in the side plate, as shown in Fig. 4.

The brake mechanism can be of any construction and is hung from the transoms in the customary manner. This brake mechanism has been omitted from the drawings to avoid confusion.

The springs 12, at each side of the truck, are hung from the side frames by links 21 and, in the present instance, the side frames have openings 22 some distance from the top and secured to the inner side of each side frame is a bearing 23, which extends through the opening and forms a support for the tubular cross member 24 to which the links 21 are hung so that the springs are properly supported from the frames. In order to stiffen the gussets 20 and the side frame, I provide angle braces 25, which extend from the upper flange 18 of each side frame 1 to the said gussets 20.

26 is a bearing for the chafing plate 27 and each bearing is secured to the frames and to the angle brace 25. Thus the gussets, or corner pieces 20, are rigidly supported and firmly connect the transoms with the side plates.

The bolster in the present instance is made, as shown in Fig. 7, from sheet metal. The blank is cut out at each end, as at 17, and is bent on the lines x—x to a U-shaped form, as illustrated in Fig. 7. Spring plates 32, are inserted between the two sides of the bolster and secured thereto preferably by rivets. These spring plates not only act as supports for the bolster on the springs 12, but also act to reinforce the projecting portions of the bolster, which are cut away, as at 17, to allow the bolster to project under the upper member of the side frame. A chafing plate 33 is secured to each end of the bolster 13 within the frames and bears upon the chafing plates 27 carried by the transoms 14.

28, 28 are coiled spring bearings which are secured to the outside of each plate 1 and extend into the upper portion of the openings 3 between the pedestals 2. Each spring bearing 28 is recessed to receive the upper end of the spring 29. The lower end of the spring rests on the boxes 4.

30, 30 are the gibs or shoes secured to each pedestal and form the bearing for the boxes 4. Links 31 extend from one pedestal to the other below the boxes and prevent the spreading of the frame at this point.

Thus it will be understood from the above construction that I am enabled to make the side plates of a truck from one piece of sheet metal pressed into shape and the extensions or gusset pieces, which are usually made separate and secured both to the transoms and to the side plates, are made integral with the side plates, forming an exceedingly substantial construction and utilizing the metal which is cut from the side plates to form the extensions.

I claim:—

1. The combination in a car truck, of two side frames made of pressed sheet metal and each having an elongated central opening therein and also having integral gussets at the upper edge of the opening formed by bending the metal from the plate; and transoms extending from one side frame to the other and to which the gussets are secured.

2. The combination in a truck, of two side frames, each frame formed of a single piece of metal pressed into shape and flanged and having a central opening and flanged around said opening and having gussets formed from the metal pressed from the opening and arranged at right angles to the body of the frame; with transoms extending from one frame to the other and secured to the said gussets.

3. The combination in a car truck, of two side frames, each side frame being made of a single piece of sheet metal pressed into shape and flanged around its outer edge, the flanges being turned toward the center of the truck, each plate having a central opening and flanged around the opening, the flanges also extending toward the center of the truck and having triangular gussets pressed from the metal of the side frames and at right angles to the said side frames; transoms extending from one side frame to the other and secured to the said corner pieces; and diagonal braces extending from the corner pieces to the upper flange of each side frame.

4. The combination in a truck, of two side frames; end bars connecting the two side frames, the side frames being made from a single sheet of metal and having recesses for the boxes and a central opening; in-turned flanges extending around the outside of the frame and around the opening and the recesses, the upper flange at the central opening being extended to form gussets located below the top of the side frame of the truck; transoms extending from one side frame to the other and secured to the extended angle braces; boxes located in each opening; axles mounted in the boxes; and wheels carried by the axles.

5. The combination in a truck, of two side frames; end bars connecting the frames; transoms extending from one frame to the other at the center of the truck and spaced apart; a bolster in said space, the side frames having in-turned flanges; in-turned gussets to which the transoms are secured; diagonal braces extending upward from the gussets to the upper edge of each frame; and chafing plates secured to the transoms and to the diagonal braces.

6. A side frame for a car truck made of pressed sheet metal having a central opening and pedestal openings at each side of the central opening, and having integral gussets projecting inwardly from the upper edge of the central opening.

In testimony whereof, I have signed my name to this specification, in the presence of two subscribing witnesses.

BENJAMIN R. VAN KIRK.

Witnesses:
CLYDE T. MOYER,
WM. A. BARR.